United States Patent [19]
Fossella

[11] Patent Number: 5,531,549
[45] Date of Patent: Jul. 2, 1996

[54] AUTO-LOCK DRILL CHUCK

[75] Inventor: Gregory Fossella, Osterville, Mass.

[73] Assignee: Great Bay Tool Corporation, Hyannis, Mass.

[21] Appl. No.: 334,726

[22] Filed: Nov. 4, 1994

Related U.S. Application Data

[63] Continuation-in-part of Ser. No. 221,384, Mar. 31, 1994, Pat. No. 5,448,931, which is a continuation-in-part of Ser. No. 638,828, Jan. 8, 1991, abandoned, which is a continuation-in-part of Ser. No. 387,220, Jul. 28, 1989, abandoned, Ser. No. 392,206, Aug. 10, 1989, Pat. No. 5,067,376, and Ser. No. 567,290, Aug. 14, 1990, Pat. No. 5,090,273.

[51] Int. Cl.$^6$ .................................. B23B 31/171
[52] U.S. Cl. ......................... 408/240; 279/71; 279/140; 279/151; 279/902
[58] Field of Search ...................... 408/240; 279/56, 279/60, 61, 71, 81, 43.9, 123, 140, 151, 902

[56] References Cited

U.S. PATENT DOCUMENTS

| | | |
|---|---|---|
| D. 290,014 | 5/1987 | Christiansen . |
| D. 312,760 | 12/1990 | Colvin . |
| D. 340,845 | 11/1993 | Holmgren . |
| 346,310 | 7/1886 | O'Neill . |
| 581,427 | 4/1897 | Olson . |
| 877,773 | 1/1908 | Holm . |
| 912,117 | 2/1909 | Green . |
| 915,443 | 3/1909 | Jones . |
| 1,000,277 | 8/1911 | McCoy . |
| 1,074,594 | 10/1913 | Andersen . |
| 1,243,300 | 10/1917 | Jacoby . |
| 1,274,337 | 7/1918 | Schwartz . |
| 1,291,421 | 1/1919 | Colter . |
| 1,357,935 | 11/1920 | Argetsinger . |
| 1,410,080 | 3/1922 | Schwahlen . |
| 1,450,641 | 4/1923 | Ograbisz . |
| 1,844,616 | 2/1932 | Whiton . |
| 2,445,147 | 7/1948 | Meunier ................................. 279/71 |
| 2,580,247 | 12/1951 | Secondi et al. . |
| 2,788,216 | 4/1957 | Chasar ................................. 279/151 |
| 2,860,881 | 11/1958 | Perrachione . |
| 2,979,089 | 4/1961 | Piesker . |
| 3,248,120 | 4/1966 | Volpe ................................. 279/71 |
| 3,377,893 | 4/1968 | Shorb . |
| 3,506,277 | 4/1970 | Harms ................................. 279/902 |
| 3,535,776 | 12/1970 | Haviland ............................. 408/240 |
| 3,664,213 | 5/1972 | Anati . |
| 3,724,299 | 4/1973 | Nelson . |
| 3,898,897 | 8/1975 | Jauhiainen . |
| 4,022,086 | 5/1977 | Ramsey . |
| 4,213,355 | 7/1980 | Colvin . |
| 4,222,577 | 9/1980 | Giffin ................................. 279/151 |

(List continued on next page.)

FOREIGN PATENT DOCUMENTS

| | | |
|---|---|---|
| 610467 | 12/1960 | Canada . |
| 3924323A1 | 1/1991 | Germany . |
| 3924323 | 1/1991 | Germany . |
| WO91/01894 | 2/1991 | WIPO . |

OTHER PUBLICATIONS

"Instruction Manual" Cordless Ratchet, 6080, Black & Decker, 1988.
"Skil Operating Guide Model 2238 Cordless Power Wrench," Skil Corporation.

Primary Examiner—Daniel W. Howell
Attorney, Agent, or Firm—Wolf, Greenfield & Sacks

[57] ABSTRACT

A keyless chuck assembly for a hand-held drill includes a housing, three jaws for gripping a drill which is to be turned by the drill chuck assembly. The jaws are retained in the assembly and confined to radial motion with respect to the drive shaft by means of T-shaped guide slots in the bottom of the drive shaft and cooperating T-shaped ribs on the tops of the jaws. The jaws have a gripping surface and a cam surface. A rotatable adjusting ring engages the jaws to move them in the radial direction to secure and release the drill bit. The jaws can include a resilient material between the gripping surface and the cam surface to allow the chuck jaws to more securely grip the drill bit. A locking mechanism prevents rotation of the ring which would allow the jaws to open.

21 Claims, 8 Drawing Sheets

U.S. PATENT DOCUMENTS

| | | |
|---|---|---|
| 4,235,134 | 11/1980 | McLendon . |
| 4,366,733 | 1/1983 | Colvin . |
| 4,378,714 | 4/1983 | Colvin . |
| 4,385,534 | 5/1983 | Nichols . |
| 4,498,682 | 2/1985 | Glore ................................... 279/60 |
| 4,524,649 | 6/1985 | Diaz et al. . |
| 4,608,887 | 9/1986 | Colvin . |
| 4,663,999 | 5/1987 | Colvin . |
| 4,722,252 | 2/1988 | Fulcher et al. . |
| 4,757,729 | 7/1988 | Martinmaas . |
| 4,813,309 | 3/1989 | Kang . |
| 4,884,480 | 12/1989 | Briese . |
| 4,892,016 | 1/1990 | Anderson . |
| 4,911,040 | 3/1990 | Kim . |
| 4,932,292 | 6/1990 | Merrick . |
| 5,074,174 | 12/1991 | Kim . |
| 5,213,015 | 5/1993 | Disston, Jr. . |

AUTO-LOCK DRILL CHUCK

RELATED APPLICATIONS

This application is a continuation-in-part of application Ser. No. 08/221,384 filed Mar. 31, 1994, now U.S. Pat. No. 5,448,931, which in turn is a continuation-in-part of prior co-pending application Ser. No. 07/638,828, filed Jan. 8 1991, now abandoned, which in turn is a continuation-in-part of prior co-pending application Ser. No. 07/387,220 filed Jul. 28, 1989, now abandoned, Ser. No. 07/392,206 filed Aug. 10, 1989, now U.S. Pat. No. 5,067,376 dated Nov. 26, 1991 and Ser. No. 07/567,290 filed Aug. 14, 1990, now U.S. Pat. No. 5,090,273. The disclosures of these applications is incorporated herein by reference.

INTRODUCTION

This invention relates to a drill chuck which is designed to lock drill chuck jaws onto a drill bit without the use of a traditional drill chuck key.

The present invention is an improvement of the drill chucks of the prior art. Most conventional drill chucks in use today require a chuck key to tighten and secure the jaws of the chuck on the drill bit. Because chuck keys are separate pieces from the drills, they frequently are lost or misplaced, and without keys drills are unusable.

One object of the present invention is to provide a drill chuck which may be locked on a drill bit without the use of a drill chuck key.

Another object of the present invention is to provide a drill chuck which has relatively few parts and is stronger than chucks of the prior art.

Yet another object of the present invention is to provide a drill chuck in which the jaws may be conveniently adjusted to accommodate varied drill bit sizes and locked in position by hand without special tools or keys.

To accomplish these and other objects, the drill chuck of the present invention is adapted to operate on a shaft which is rotatably mounted within a housing. A motor in the housing rotates the drive shaft to provide rotation for a drill. Three radially extending slots are provided on the bottom of the drive shaft, and three jaws move radially inward and outward, one in each slot. The jaws have gripping surfaces disposed on the inside face of the jaws that grip a drill bit. The radial motion of the jaws is controlled by an adjusting ring which is disposed around the jaws and is adapted to rotate relative to the drive shaft. The ring has a gripping surface on its outer circumference which facilitates its rotation by the tool user. In a preferred embodiment of this invention, the drive shaft has a flange at its lower-most end that supports the adjusting ring. The adjusting ring surrounds the jaws, and the jaws and adjusting ring have mating cam surfaces which cause the jaws to move radially towards or away from the center of the drive shaft when the adjusting ring is rotated. A jaw locking mechanism is provided having ratchet teeth on the lower portion of the adjusting ring and the upper portion of the flange, which when engaged, allow the adjusting ring to rotate only in the direction which closes the jaws. A spring biases the adjusting ring toward the flange so that the teeth are engaged and the adjusting ring cannot turn to open the jaws and release the drill bit. To spread the jaws and release a drill bit, the adjusting ring is lifted by the operator against the resilient force of the spring to disengage the teeth and the adjusting ring can then be turned so as to open the jaws.

In one embodiment of the present invention, a resilient material is provided on the jaws that enables the jaws to secure the drill bit more effectively. The resilient material is compressed as the jaws tighten around a drill bit. The resilient expansion force in the compressed resilient material causes the jaws to more securely engage the drill bit. The secure engagement between the jaws and the drill bit transmits the rotational force required for drilling. The resilient material can be disposed on the inner gripping surface of the jaw. Alternatively, the resilient material may be sandwiched between a metallic gripping portion and a metallic outer portion of the jaw. The resilient material can be any compressible material such as rubber or plastic that can be bonded to the jaw.

This invention may be used in any machine which uses chuck jaws, including but not limited to, a hand-held drill, a drill press, or a lathe, to lock an object in place.

These and other objects and features of the present invention will be better understood and appreciated from the following detailed description of the preferred embodiment thereof and shown in the accompanying drawings.

DETAILED DESCRIPTION OF THE INVENTION

Figure 1:
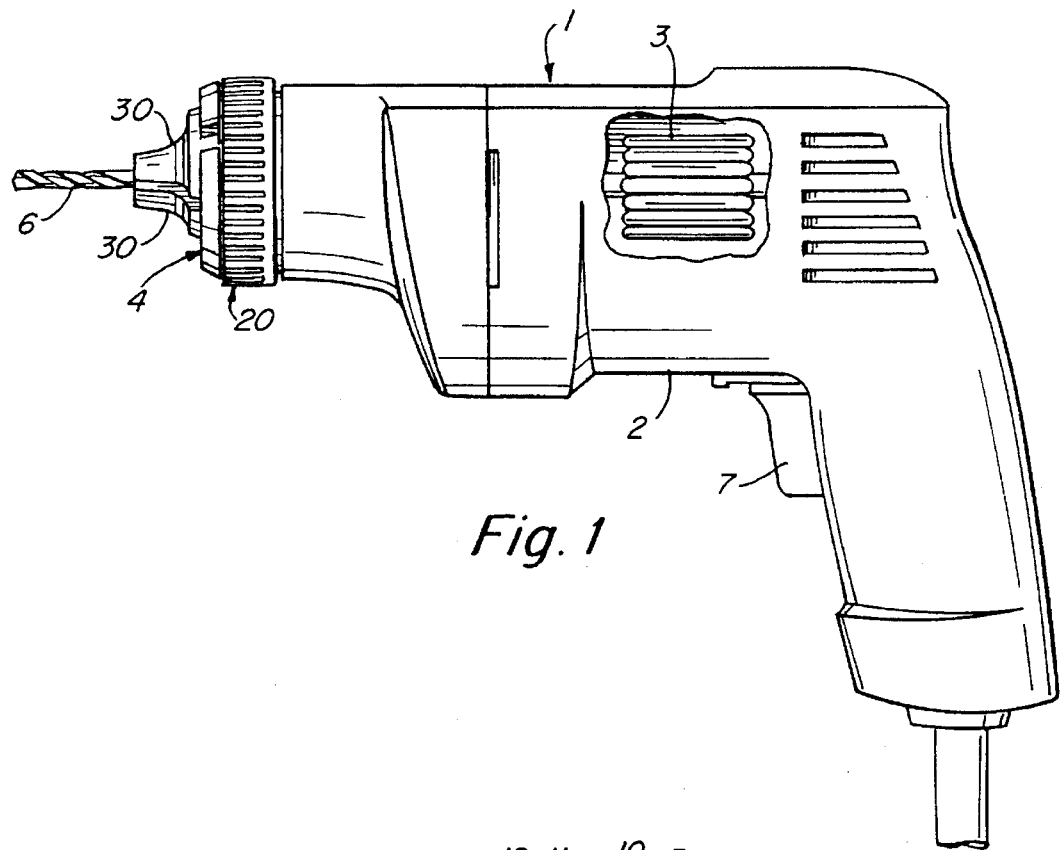
FIG. 1 is a side elevation view of a hand held drill incorporating the drill chuck of the present invention with parts broken away to show the motor.

FIG. 1 shows a hand held drill 1 which incorporates a drill chuck, indicated generally by reference numeral 4, according to the present invention. A motor 3 located in drill housing 2 is activated by a trigger 7 and operates to turn a drill bit 6. Drill chuck jaws 30 securely engage the drill bit 6. As discussed in detail below, an adjusting ring 20 operates to close and lock the jaws on the drill bit.

Figure 2A:
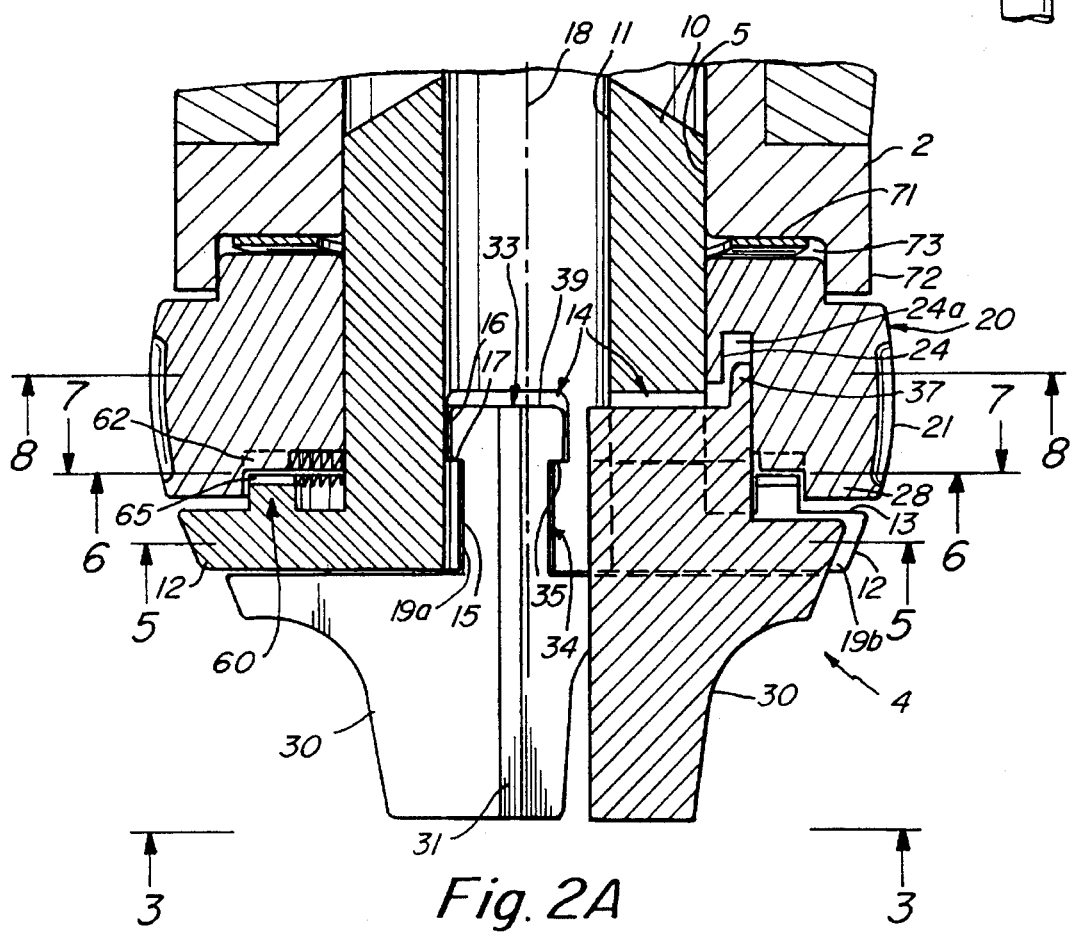
FIG. 2A is a vertical cross-sectional view through the head of a drill chuck of the present invention, with its jaw locking mechanism shown in the disengaged configuration enabling the jaws to be opened by rotation of the adjustable ring.
Figure 2B:
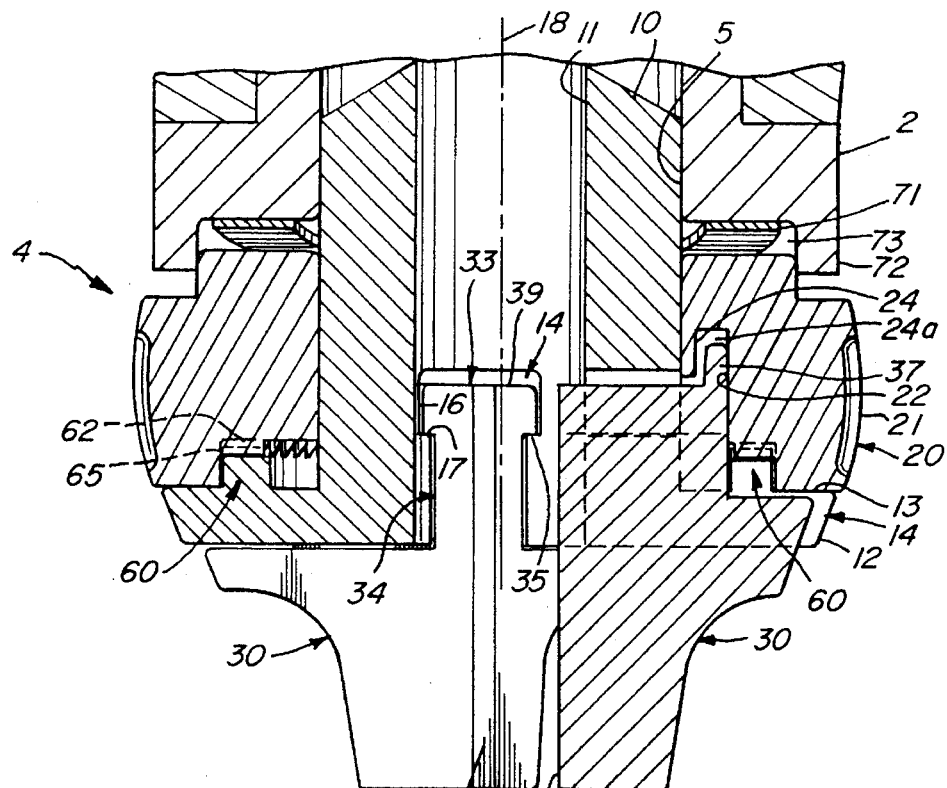
FIG. 2B is a cross-sectional view similar to FIG. 2A but showing the jaw locking mechanism in the engaged position wherein the opening of the jaws is prevented.

FIGS. 2A and 2B show the drill chuck 4 in greater detail disposed on the end of housing 2. The housing 2 is provided with a cylindrical chamber 5 open at the bottom and having an axis 18. A drive shaft 10 extends through the chamber 5 and is operatively connected to and driven by the motor 3. The drive shaft 10 is hollow and has an axial opening 11 which extends to its lower end. A support 12 normal to the shaft 10 extends radially outward from the lower end of shaft 10. The support 12 is shown as a flange in the Figures. Subsequent references to the support 12 use the term flange. The lower end of the drive shaft also has three T-shaped jaw guide slots, indicated generally at 14. The slots 14 have a first portion 19a that extends along the drive shaft and a second portion 19b that extends through the flange 12. Each portion 19a, 19b of the slots 14 extends radially from the axis 18 of the drive shaft. The slots 14 are sized to slidably receive the jaws 30 and guide the jaws in radial motion toward and away from the axis 18. Additionally, the jaw guide slots 14 transfer the rotational motion of the drive shaft 10 to the jaws 30 which engage the drill bit 6 as shown in FIG. 1. The guide slots 14 each have a narrow passage 15 which is connected to a larger retaining channel 16 that has a shoulder 17 to retain the jaw 30 in the slot and prevent the jaw from becoming disengaged with the drive shaft.

Figure 3:
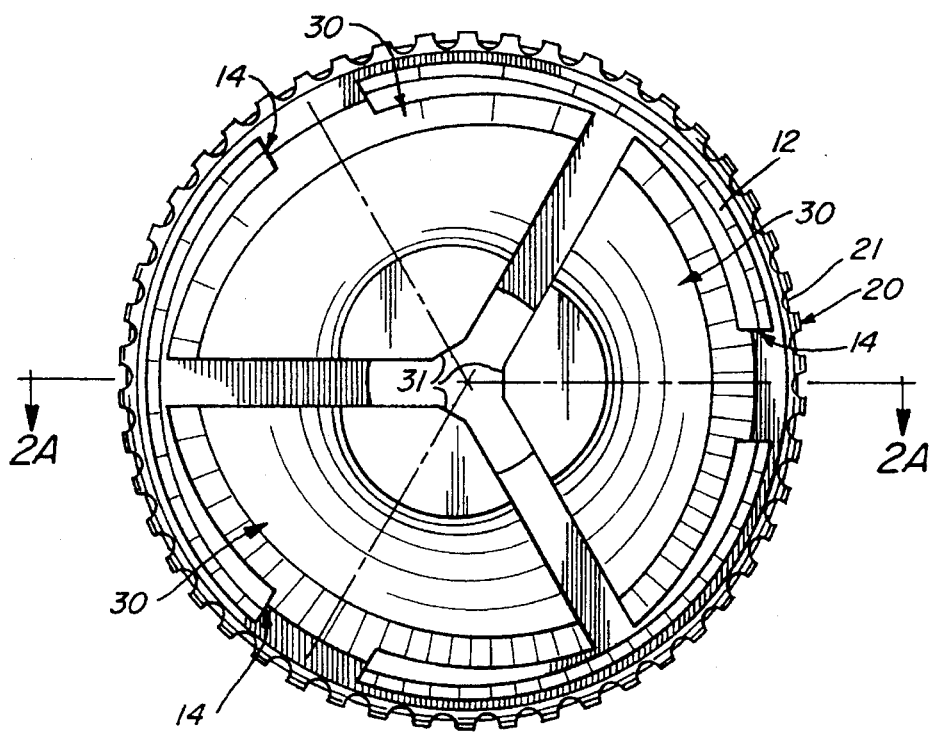
FIG. 3 is a bottom plan view taken from line 3—3 in FIG. 2A.
Figure 4:
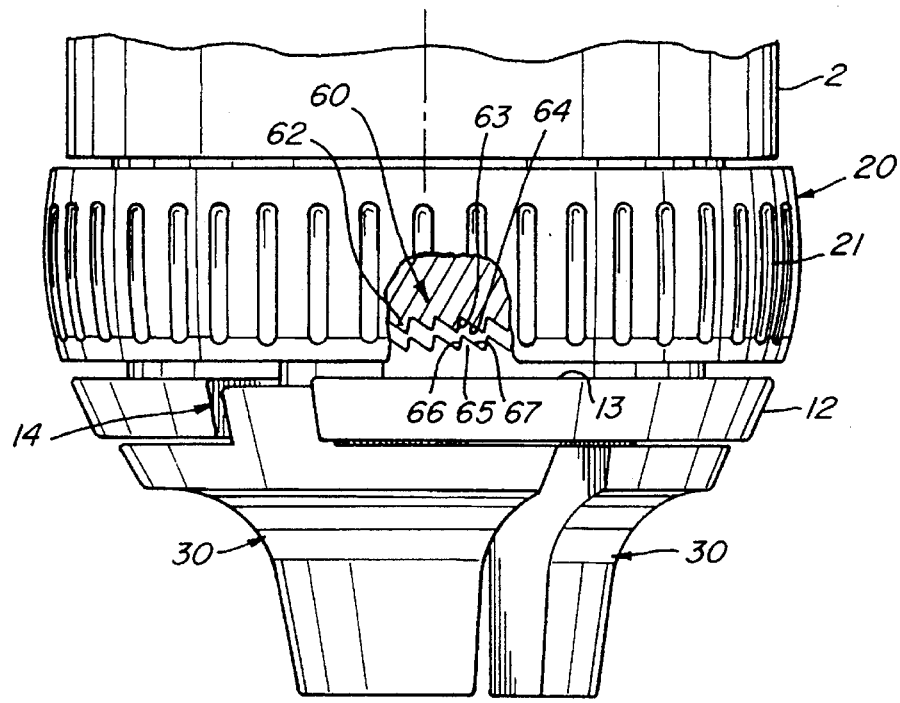
FIG. 4 is a side elevation view of the adjustable chuck with parts broken away to show the teeth of the locking mechanism in the disengaged position.
Figure 5:
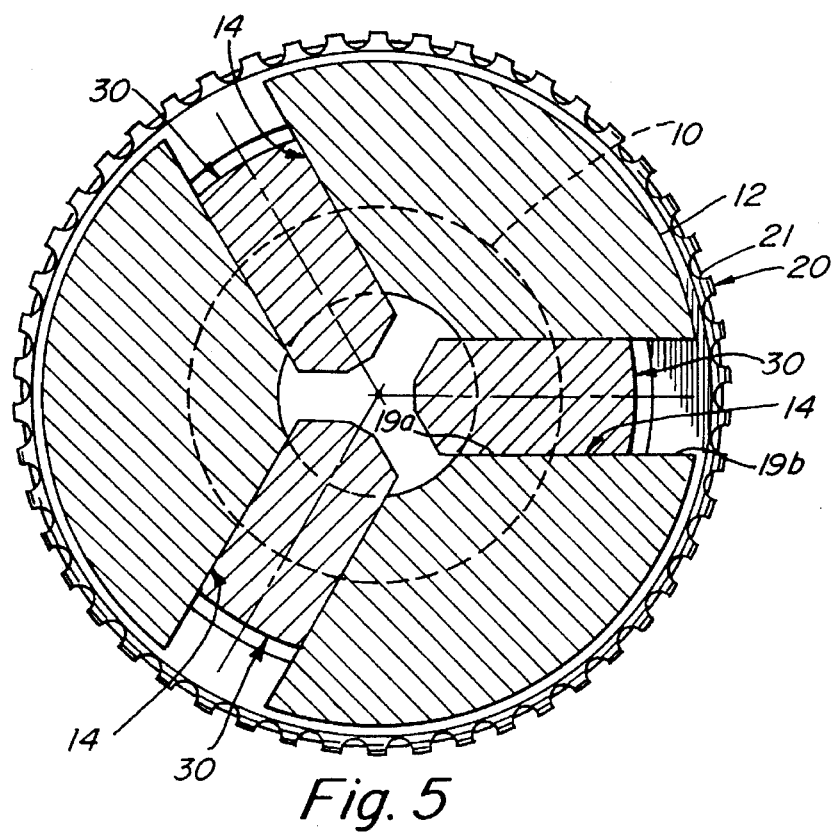
FIGS. 5, 6, 7 and 8 are horizontal cross-sectional views of the drill chuck taken along section lines 5—5, 6—6, 7—7, and 8—8, respectively, in FIG. 2A.

Each jaw 30 has a gripping surface 31 which faces inwardly toward the axis 18 of the drive shaft 10. As illustrated in FIGS. 3 and 4, the jaws 30 are V-shaped with the apex of the V-shape facing the axis 18 and forming the gripping surface 31. When tightened on a drill bit, the gripping surface 31 makes secure contact with the bit. The jaws 30 are retained in the assembly and confined to radial motion with respect to the drive shaft by means of the T-shaped guide slots 14 in the bottom of the drive shaft and the cooperating T-shaped ribs 33 on the tops of the jaws. The T-shape of the ribs 33 is formed by an upwardly extending narrow waist 34 and a cap 39 having a lower shoulder 35. The shoulders 35 cooperate with the shoulders 17 in the slots to retain the jaws 30 within the slots of drive shaft 10.

Figure 6:
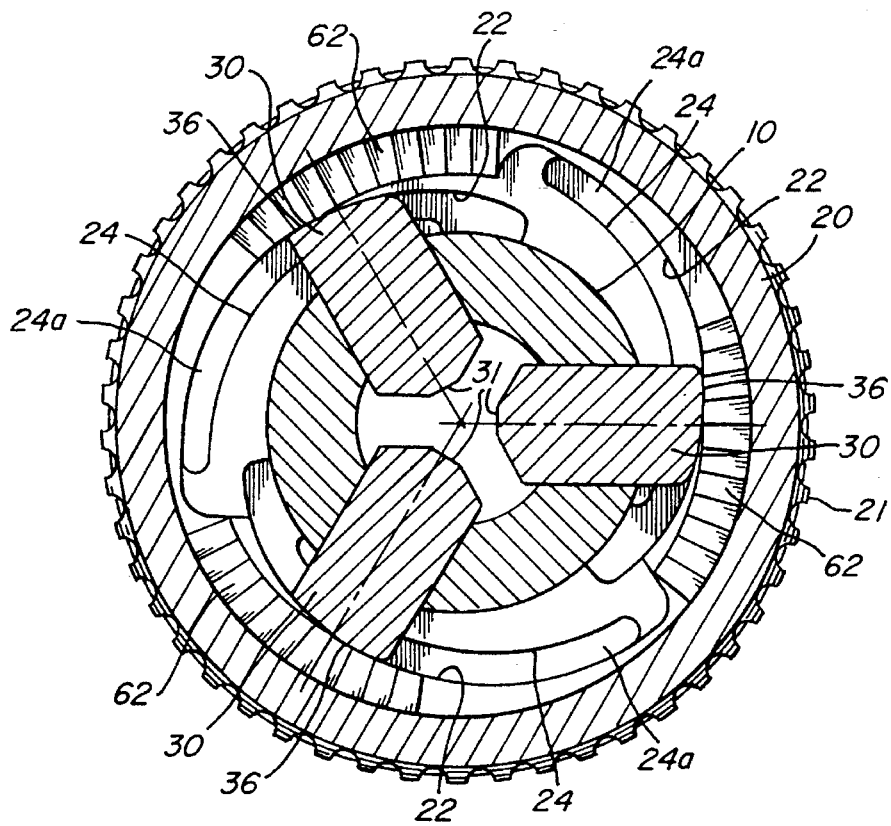
Figure 7:
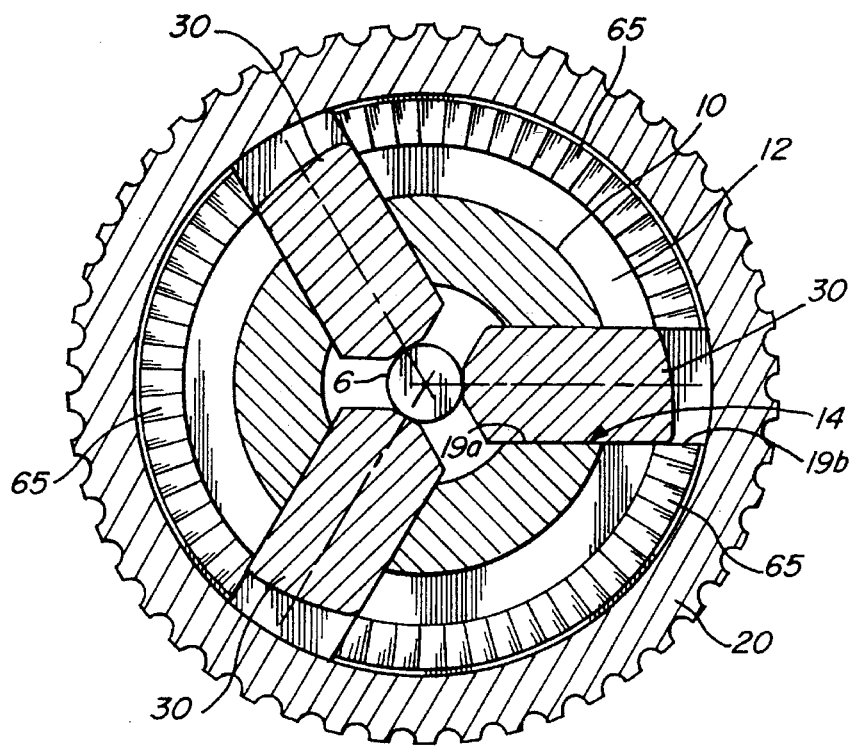
Figure 8:
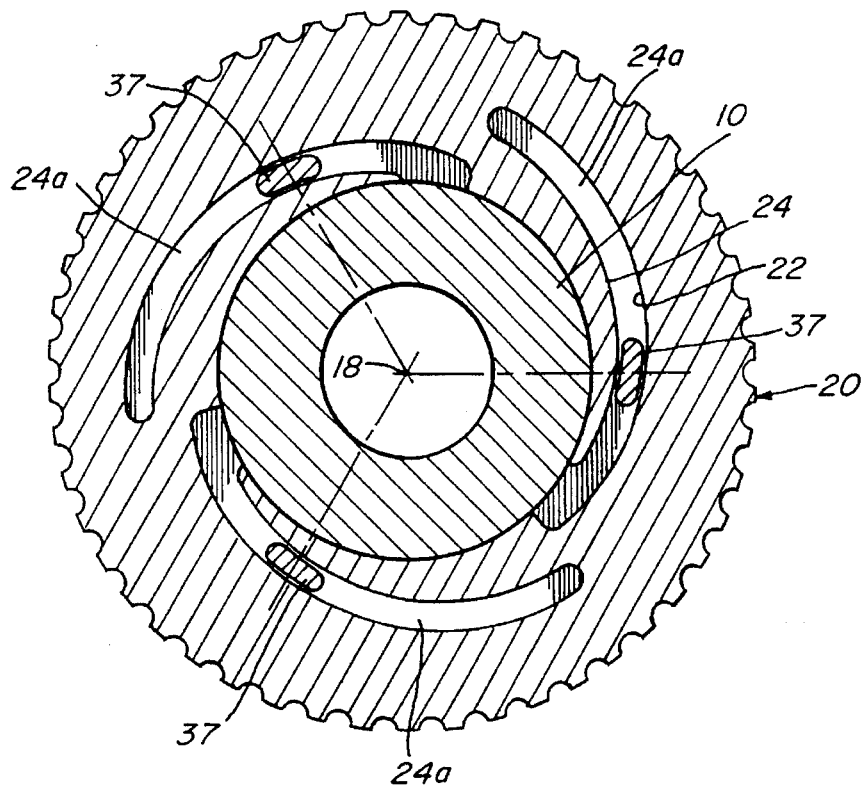

The adjusting ring 20 encircles the lower portion of the drive shaft 10 above the support surface 12. The ring 20 cooperates with the slots 14 to move the jaws 30 radially toward and away from the axis 18 to close and open them. As best shown in FIGS. 6–8, a cam surface 36 is provided in the outer side of the upper portion of each jaw 30. The surfaces 36 cooperate with the inwardly facing cam surface 22 on the adjusting ring 20 to move the jaws radially inward when the adjusting ring 20 is turned counterclockwise as viewed in FIGS. 6 and 8. The adjusting ring 20 has a ribbed collar 21 on its outer circumference which facilitates gripping of the ring and makes the ring 20 easier to rotate. The jaws are opened by clockwise rotation of the adjusting ring 20 as viewed in FIGS. 6 and 8 by virtue of the registration of cam followers 37 carried by the jaws 30 with the outwardly facing cam surfaces 24 in the adjusting ring 20. The outwardly facing cam surfaces 24 are parallel with the cam surfaces 22 and define the margins of cam tracks 24a along which the cam follower 37 rides.

FIG. 4 shows a partial cutaway view of a locking mechanism, indicated generally at 60, which prevents the unintentional spreading of the jaws. Ratchet teeth 65 which form part of the locking mechanism are disposed on the upper surface 13 of the flange 12 of the drive shaft 10. The teeth 65 engage ratchet teeth 62 on the bottom of the adjusting ring 20. As shown in FIG. 6, the teeth 62 on the adjusting ring 20 extend arcuately in three sections. The teeth 65 on the flange 12 extend circumferentially on the upper surface 13 between the slots 14 (see FIG. 7). As shown in FIG. 4 (the adjusting ring 20 is in the raised position above the flange 12), each tooth on the adjusting ring 20 is saw-tooth in shape having one substantially vertical side 63 and one inclined side 64. Preferably an 82° angle (8° offset) is used for the side 63. The preferred angle enables the teeth 62 and 65 to disengage when the adjusting ring 20 is locked tightly. Similarly the teeth on the upper surface 13 of the flange 12 have one substantially vertical side 66 and an inclined side 67. By an inspection of FIG. 4, it is evident that when the teeth are engaged, the adjusting ring cannot be turned counterclockwise as viewed in that figure because the mating sides of the opposing teeth abutting one another are substantially vertical and, therefore the adjusting ring cannot ride over the teeth on the flange. Because counterclockwise rotation of the adjusting ring is required to open the jaws, the jaws cannot be opened unless the adjusting ring is raised so as to disengage the teeth 62 on the adjusting ring from the teeth 65 on the flange 12.

As shown in FIGS. 2A and 2B, a wave spring 71 is disposed between the upper surface of the adjusting ring 20 and the lower surface of the housing 2. The wave spring 71 urges the adjusting ring 20 downwardly towards the flange 12 of the drive shaft 10 to cause the teeth 65 of the flange 12 to engage the teeth 62 of the adjusting ring 20. In that position, the operator can rotate the adjusting ring in a clockwise direction as the incline surfaces of the respective teeth will cause the teeth segments to ride up and over the opposed teeth. The wave spring 71 is not so stiff as to prevent the operator from turning the adjusting ring with his fingers, as the spring will allow the adjusting ring 20 to move up and down the small distance required to enable the teeth 62 of the ring 20 to step over the teeth 65 on the flange. As clearly shown in FIG. 1A and 1B a dirt barrier 72 in the form of a collar extends downwardly from the peripheral of the housing 2 and closes the chamber 73 occupied the wave spring between the lower surface of the housing 2 and the upper surface of the adjusting ring 20.

A second dirt barrier 28 in the form of a circular collar is provided to protect the locking mechanism. The dirt barrier 28 is on the lower surface of the adjusting ring 20 radially beyond the teeth and prevents foreign matter from collecting between the teeth, which could interfere with the proper locking of the jaws.

In order to close the jaws on the drill bit, the adjusting ring 20 is turned counterclockwise as viewed in FIG. 6, which causes the cam surfaces 22 on the adjusting ring to bear against the mating surfaces 36 on the jaws to move them inwardly in a radial direction along the path defined by the T-shaped slots 14 in the drive shaft 10. The adjusting ring 20 may be turned readily because the teeth 65 on the flange 12 and the teeth 62 on the adjusting ring have ramps which allow the adjusting ring 20 to rotate. The wave spring 71 yieldingly biases the adjusting ring to the flange. When it is desired to release the drill from the chuck, the jaws may be opened simply by first lifting the adjusting ring 20 to disengage the teeth 62 from the teeth 65. When the adjusting ring is raised, the mating surfaces of the gear teeth are disengaged so that the ring may be turned counterclockwise. The cam surfaces 24 will force the cam followers 37 to draw the jaws 30 apart.

Figure 9:
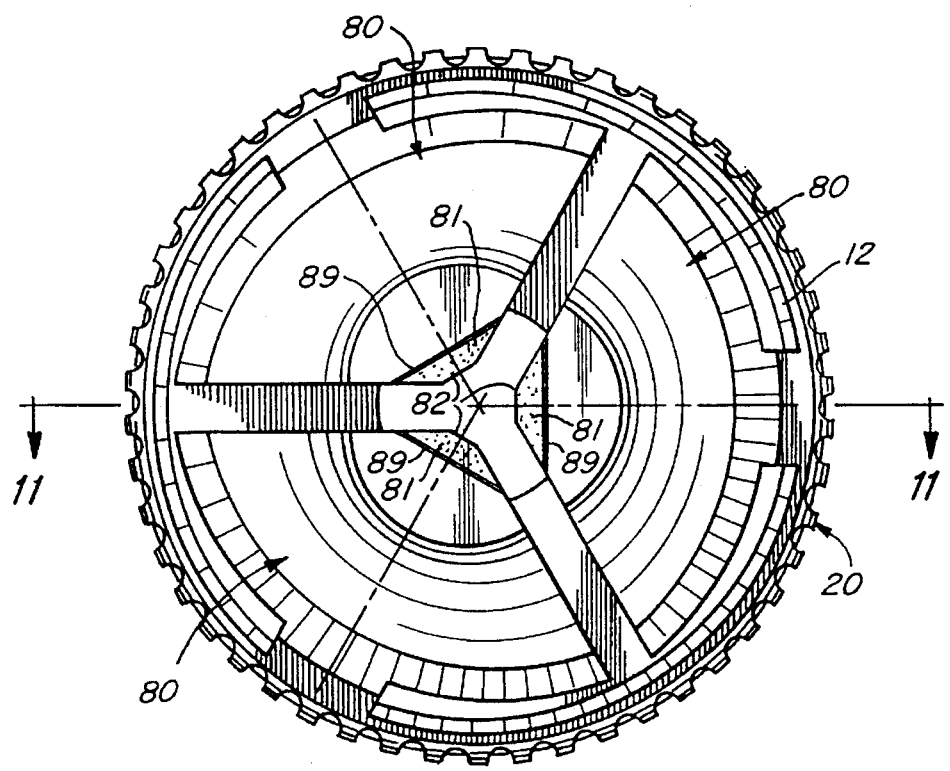
FIGS. 9 and 10 are a side elevation view and a bottom plan view, respectively, of a drill chuck incorporating a resilient material on the jaws.
Figure 10:
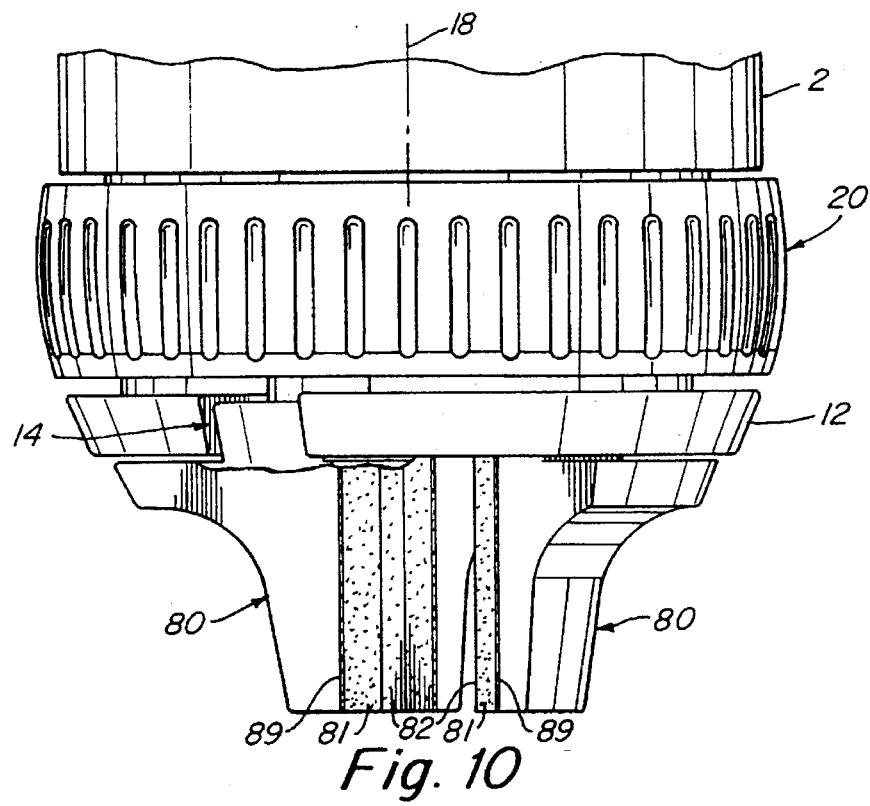
Figure 11:
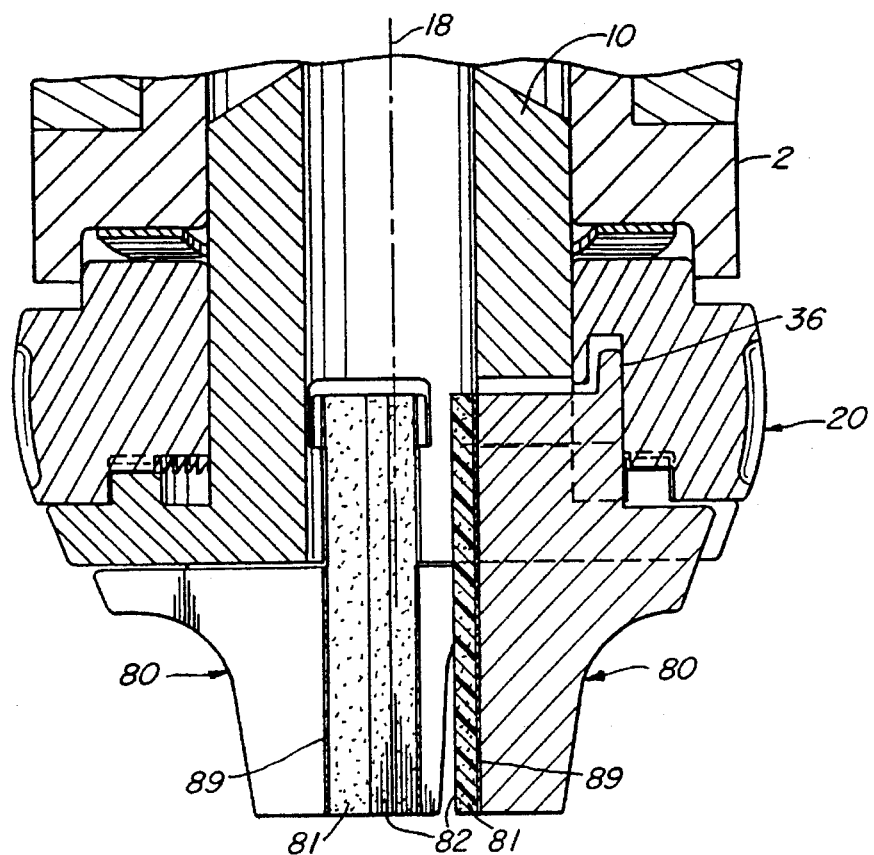
FIG. 11 is a vertical cross sectional view taken along the lines 11—11 of FIG. 9.

FIGS. 9–11 show a modified jaw 80 which can be used with the keyless chuck. In these figures, the same reference numerals are given to like elements of the prior embodiment. The modified jaw 80 has a resilient material 81 affixed to the jaws 80 at the gripping surface 82 by an adhesive as suggested by the line indicated by reference numeral 89. The resilient material 81 substantially eliminates slippage between the drill bit 6 (shown in FIG. 1) and the jaws 80. The resilient material can be rubber or a pliable plastic. As shown in FIG. 10, the material 81 has a trapezoidal shape with a narrow gripping surface 82 facing the axis 18. In FIG. 10, one jaw has been removed to clearly show the resilient material. As shown in FIG. 11, the resilient material 81 affixed to the jaw 80 extends along the entire axial length which faces the axis 18.

When the adjusting ring 20 is turned to close the jaws 80, after the jaws contact the drill bit 6 (shown in FIG. 1), the adjusting ring 20 can be rotated across a few more teeth on the drive shaft to compress the resilient material and secure the jaws about the drill bit 6. In this embodiment, the drill bit is securely attached to the jaws because of the resilient force between the jaws and the drill bit and because the gripping surface 82 deforms slightly to increase the surface area of contact between the drill bit and the jaws 80. When the resilient material 81 is compressed, a resilient expansion force is imparted between the drill bit 6 and the jaws 80, thus the drill bit 6 is securely engaged between the jaws 80. Because the rotational force of the drill is transferred effectively through the drill chuck 4 to drill bit 6 when the drill is used for drilling. The resilient material 81 has a high elasticity; that is, any deformation which occurs in the resilient material 81 when the drill bit is within the jaws will be substantially recovered after the drill bit is released and the resilient material 81 will return to its original trapezoidal shape.

Figure 12:
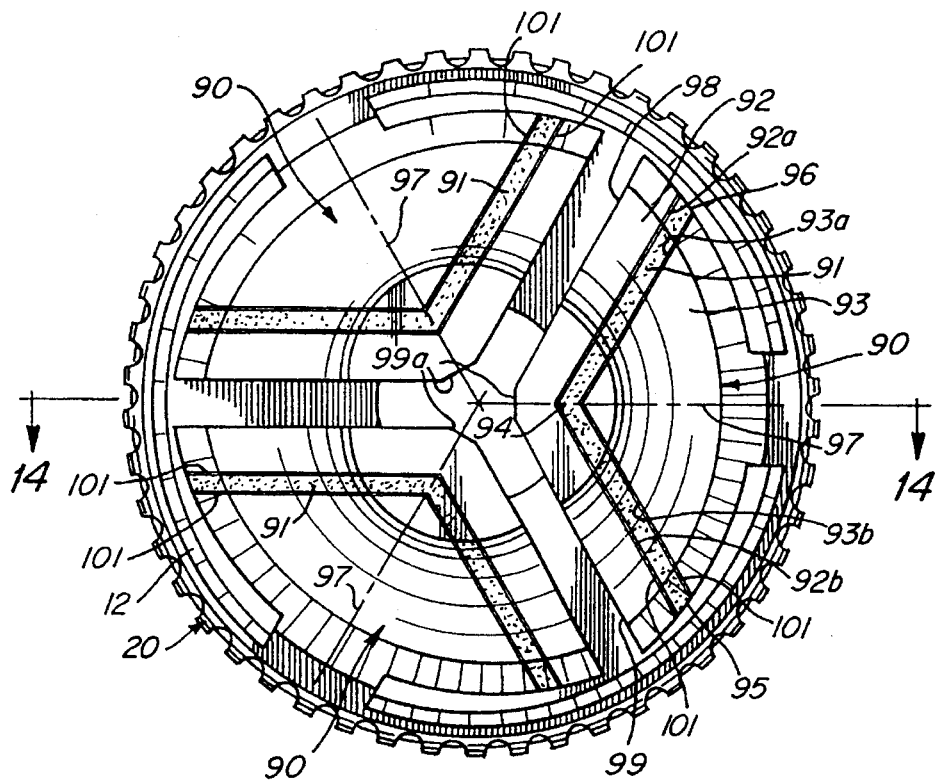
FIGS. 12 and 13 are a side elevation view, and a bottom plan view, respectively, of an alternative embodiment of the jaws having a resilient material.
Figure 13:
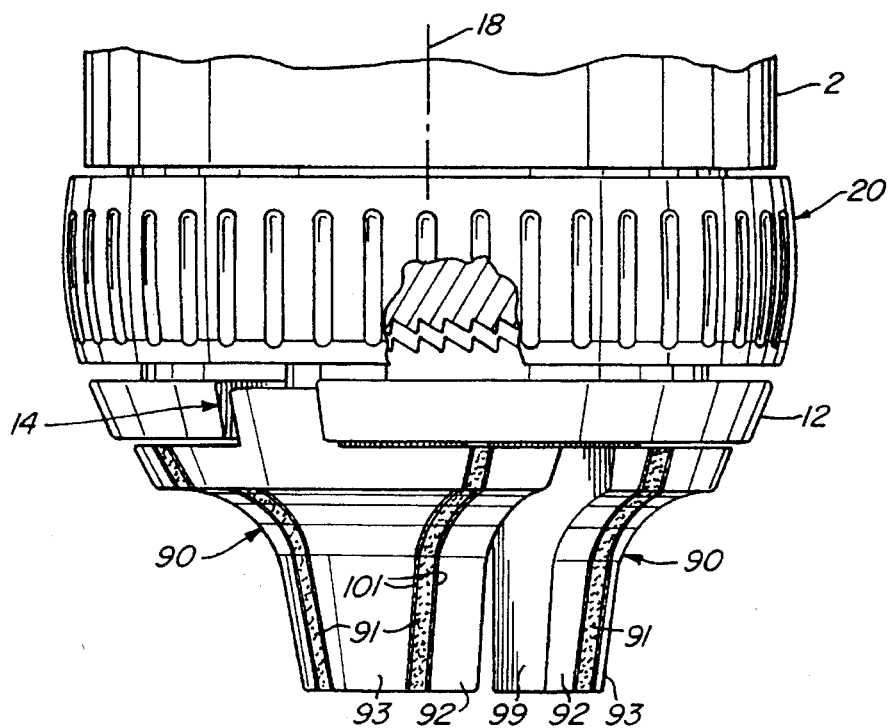
Figure 14:
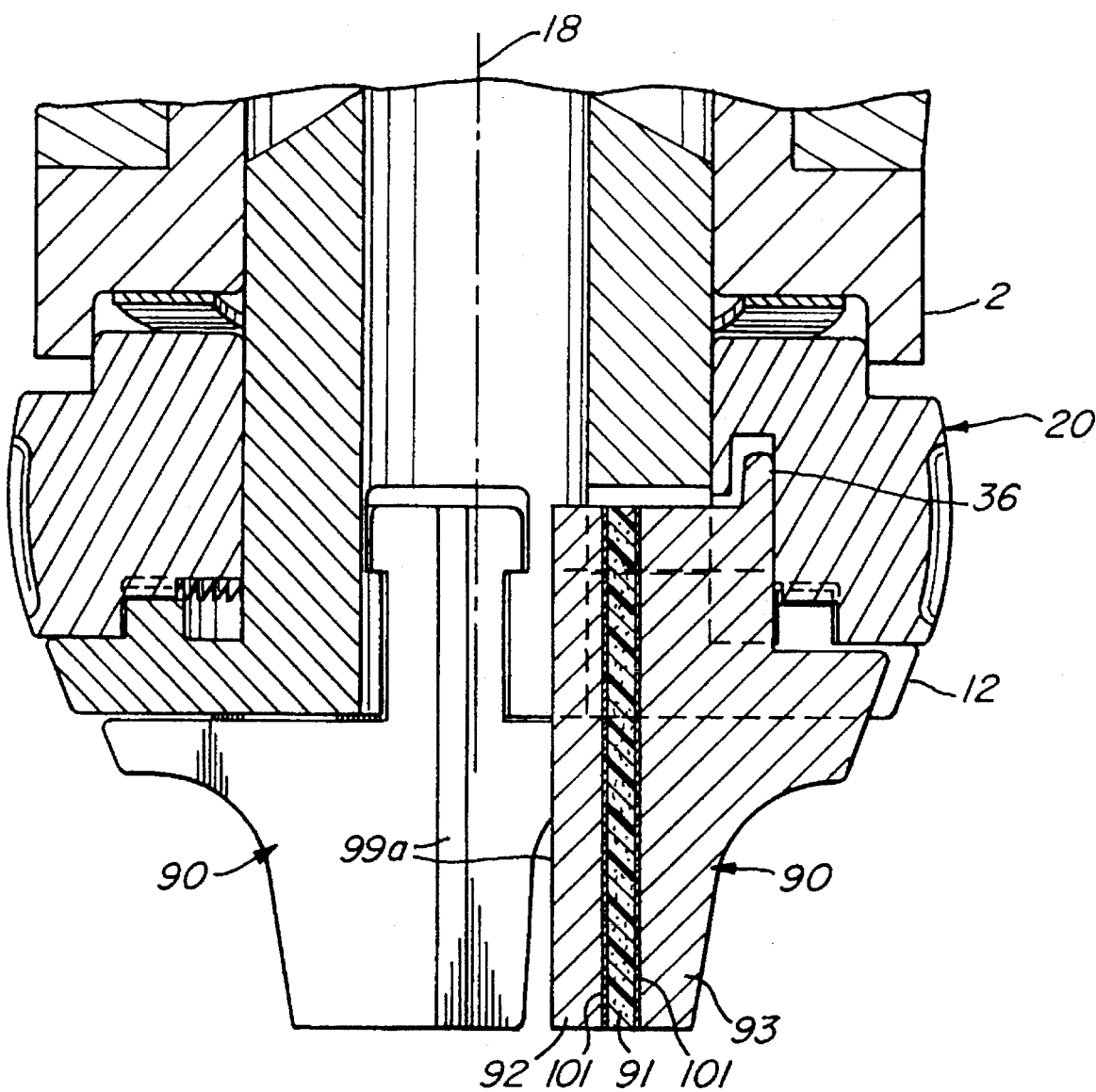
FIG. 14 is a vertical cross sectional view taken along lines 14—14 of FIG. 12.

FIGS. 12–14 show another embodiment of the drill chuck having a modified jaw 90 including a resilient material 91. In these Figures, the same reference numerals are given to like elements of the prior embodiments. As shown in FIG. 11, the resilient material 91 is sandwiched between an inside jaw piece 92 and an outside jaw piece 93 which, in the aggregate, form the jaw 90. The resilient material 91, which is the same type of resilient material used for the resilient material of the previous described embodiment, is affixed to the jaw pieces 92, 93 by an adhesive as suggested by the line indicated by reference numeral 101. A gripping surface 99*a* is provided on the inside jaw piece 92. As shown in FIG. 14, the cam surface 36 is provided on the outside jaw piece 93. In this embodiment, the resilient material has a V-shape and extends from an apex 94 to edges 95, 96 at the outer circumference of the jaws 90. The apex 94 is positioned on a line 97 which bisects the V-shaped jaw surfaces 98 and 99. The inner jaw piece 92 has surfaces 92*a*, 92*b* which face the resilient material 91. The outer jaw piece 93 has surfaces 93*a* and 93*b* which face the resilient material 91. The surfaces 92*a* and 93*a* are parallel to the surface 98 of the inner jaw piece 92. Similarly, the surfaces 92*b* and 93*b* are parallel to surface 99. As shown in FIG. 14, the resilient material 91 is between the cam surface 36 and the gripping surface of jaw 90 and extends the entire axial length of the jaw 90.

In operation, when the adjusting ring is rotated to close the jaws by the force of the adjusting ring on the cam surface 36 of the jaws 90, the gripping surface 99*a* of the jaws 90 will contact the drill bit 6 (shown in FIG. 1). The jaws are secured into the drill bit by rotating the adjusting ring 20 slightly further (across a few more ratchet teeth 65) in the same direction. As the adjusting ring 20 is turned, the jaws are forced radially inward and the resilient material 91 is compressed between the inside piece 92 and the outside piece 93. The compressed resilient material 91 has a resilient expansion force which secures the engagement between the inside piece and the drill bit 6. Thus, the drill bit is securely engaged within the chuck and the chuck transfers the rotational force from the drill to the drill bit.

Having described and illustrated this invention in detail, those skill in the art upon reading the description will recognize that numerous modifications may be made without departing from the spirit of this invention. Therefore, it is not intended that the scope of the invention be limited to the specific embodiments illustrated and described. Rather, its scope is to be determined by the appended claims and there equivalents.

What is claimed is:

1. A power drill for turning a drill bit having a keyless drill chuck comprising:

a drill housing and a motor in the housing for driving the drill, a drive shaft rotatable about an axis and connected to the motor, the drive shaft having top and bottom ends and an axially extending chamber open at the bottom end of the drive shaft, a support rigidly secured to the drive shaft and extending outwardly with respect to the axis, a plurality of equally spaced radial slots extending upwardly from the bottom of the drive shaft and a shoulder provided in each slot spaced from the bottom of the drive shaft, a plurality of chuck jaws, one for each slot, having narrow waists that are positioned in the slots, confining the jaws to radial motion in the slots for closing and opening the jaws, a jaw shoulder attached to the narrow waist and cooperating with the shoulder on the drive shaft to secure the jaw in axial position with respect to the drive shaft, the jaws extending below the bottom end of the drive shaft, a gripping surface disposed on the jaws at an inside face with respect to the axis, and a cam surface disposed on the jaws, an annular ring rotatable on and surrounding the drive shaft above the support and having cam surfaces which engage the jaws for moving the jaws radially in the slots in response to rotation of the adjusting ring with respect to the drive shaft, a resilient material disposed on each jaw between the gripping surface and the cam surface for absorbing a compressive force between the drill bit and the adjusting ring when the adjusting ring is turned to secure the jaws about the drill bit, a plurality interlocking ratchet teeth on the support and the adjusting ring which prevent the adjusting ring from rotating with respect to the shaft when the teeth are interlocked thereby preventing the jaws from opening, and a spring located between the housing and the adjusting ring for yieldably biasing the adjusting ring toward the support to cause the teeth to interlock, said spring enabling a user to move the adjusting ring away from the support and disengage the teeth so that the adjusting ring may be rotated with respect to the drive shaft to open the jaws for releasing a drill bit.

2. A power drill having a keyless chuck as recited in claim 1 wherein the ratchet teeth on the support are on an upper surface of the support.

3. A power drill having a keyless chuck as recited in claim 2 wherein the ratchet teeth are surrounded by an annular dust apron.

4. A power drill having a keyless chuck as recited in claim 1 wherein a dust apron surrounds the spring.

5. A power drill having a keyless chuck as recited in claim 1 wherein three chuck jaws cooperate to secure the workpiece.

6. A power drill having a keyless chuck as recited in claim 1 wherein the adjusting ring includes cam grooves and the jaws carry cam followers in the grooves, the grooves and the cam followers cooperating to open the jaws when the ring is turned in one direction.

7. A power drill having a keyless chuck as recited in claim 1 wherein the resilient material is disposed on the inside face of the jaw and is the gripping surface of the jaw.

8. A power drill having a keyless chuck as recited in claim 1 wherein the jaws each comprise two pieces and the resilient material is sandwiched between the two pieces.

9. A keyless drill chuck for centering and securing a workpiece comprising:

> a housing, a drive mechanism operatively connected to said housing,
>
> a drive shaft having an axis and extending from said housing and rotated by the drive mechanism, a plurality of slots disposed in the drive shaft,
>
> a plurality of jaws, one for each slot, carried by the slots in the drive shaft and having gripping surfaces which face the axis of the drive shaft, and a cam surface on the jaws for moving the jaws radially to open and close the jaws about the workpiece,
>
> an adjusting mechanism for enabling the jaws to open and close about a workpiece disposed within the gripping surfaces, a cam surface on the adjusting mechanism for moving the jaws radially to open and close them about a workpiece, and
>
> a locking mechanism which prevents the jaws from releasing the workpiece, said locking mechanism including a plurality of cooperating ratchet teeth between the adjusting mechanism and the drive shaft.

10. A keyless chuck as recited in claim 9, wherein said locking mechanism includes a spring for biasing the cooperating ratchet teeth into engagement.

11. A keyless chuck as recited in claim 10, wherein said spring is a wave spring.

12. A keyless chuck as recited in claim 9 wherein the teeth are disposed on an upper surface of a drive shaft support.

13. The keyless chuck as recited in claim 9 wherein three jaws cooperate to secure a workpiece.

14. A keyless chuck as recited in claim 9 further comprising a resilient material disposed on the jaws between the gripping surface and the cam surface for absorbing a compressive force between the workpiece and the adjusting mechanism when the adjusting mechanism is rotated to secure the workpiece between the plurality of jaws.

15. A chuck for centering an object along a center-line of a drive shaft axis comprising:

> a housing having a driving mechanism,
>
> a drive shaft having first and second ends and rotatably mounted in the housing and protruding therefrom, said driving mechanism operatively connected to the drive shaft, the drive shaft having a support surface extending in the normal direction from the first end of the drive shaft,
>
> a plurality of slots in the first end of the said drive shaft,
>
> a plurality of jaws, one for each slot, disposed within said slot for radial movement with respect to the shaft, said jaws having a gripping surface and a jaw cam surface,
>
> an adjusting ring surrounding the first end of the drive shaft and rotatable with respect to the drive shaft, said adjusting ring having a ring cam surface which mates with the jaw cam surface for radially moving the jaws when the ring is rotated.

16. The chuck recited in claim 15 wherein the first end of the drive shaft includes a flange.

17. The chuck recited in claim 16 wherein the adjusting ring is located between the housing and the flange.

18. A chuck as recited in claim 15 wherein a spring biases the adjusting ring toward the first end of the drive shaft.

19. A chuck as recited in claim 15, further comprising a resilient material disposed on each jaw between the jaw cam surface and the gripping surface for absorbing a compressive force between the workpiece and the adjusting ring when the adjusting ring is rotated to secure the workpiece between the plurality of jaws.

20. A chuck as recited in claim 19, wherein the resilient material is disposed on the jaw as the gripping surface.

21. A chuck as recited in claim 19, wherein the jaws each comprise two pieces and the resilient material is sandwiched between the two pieces.

* * * * *